United States Patent [19]

Lyons

[11] Patent Number: 4,773,350

[45] Date of Patent: Sep. 27, 1988

[54] FUSIBLE TEMPERATURE SIGNALING SENSOR

[76] Inventor: Terry B. Lyons, P.O. Box 99, John Day, Oreg. 97845

[21] Appl. No.: 30,981

[22] Filed: Mar. 27, 1987

[51] Int. Cl.[4] ....................... G01K 1/16; G01K 13/00; G08B 17/04

[52] U.S. Cl. .................................... 116/214; 116/217; 374/152; 374/161

[58] Field of Search ................ 116/218, 214; 374/160, 374/161, 152

[56] References Cited

U.S. PATENT DOCUMENTS

| | | | |
|---|---|---|---|
| 1,151,764 | 8/1915 | Dodson | 116/218 X |
| 1,723,902 | 8/1929 | Wainwright | 116/218 X |
| 2,431,827 | 12/1947 | Rado | 116/204 X |
| 2,677,278 | 5/1954 | Smith et al. | 374/160 X |
| 2,694,997 | 11/1954 | Alger, Jr. . | |
| 3,079,886 | 3/1963 | Green, Jr. | 116/217 X |
| 3,339,518 | 9/1967 | Fifer . | |
| 3,569,695 | 3/1971 | McLean . | |
| 3,820,499 | 6/1974 | Kliemer et al. | 116/216 X |
| 3,872,821 | 3/1975 | Havada | 116/217 X |
| 3,877,411 | 4/1975 | MacDonald . | |
| 4,092,625 | 5/1978 | Newsom | 337/405 |
| 4,118,667 | 10/1978 | Milligan | 116/217 X |
| 4,265,117 | 5/1981 | Thoma et al. . | |
| 4,459,046 | 7/1984 | Spirg . | |
| 4,501,006 | 2/1985 | Korenberg . | |

FOREIGN PATENT DOCUMENTS

| | | | |
|---|---|---|---|
| 0278591 | 10/1927 | United Kingdom | 374/152 |

*Primary Examiner*—Daniel M. Yasich
*Attorney, Agent, or Firm*—Klarquist, Sparkman, Campbell, Leigh & Whinston

[57] ABSTRACT

A temperature sensor indicates imminent mechanical failure of a device by detecting a sharp rise in temperature of the device above a normal operating temperature range. The sensor is a flexible container filled with a signal fluid and closed by a plug having a melting point which is above the normal operating temperature range of the device. Tube flexure allows it to conform substantially to the shape of a surface on the device being monitored. Flexing the tube changes its internal pressure but has no effect on the plug, which responds only to changes in temperature.

11 Claims, 1 Drawing Sheet

FUSIBLE TEMPERATURE SIGNALING SENSOR

BACKGROUND OF THE INVENTION

1. Field of the Invention

This invention relates to an improved temperature sensor for detecting an abnormally or dangerously high temperature of a substrate. More particularly, the invention concerns a temperature sensor for monitoring the condition of bearings, motors, and other devices which increase in temperature as they begin to fail.

2. General Discussion of the Background

The temperature of a machine part is often an important indication of its mechanical condition. Railroad cars, for example, have journal bearings with a normal operating temperature of about 40° C. above the ambient temperature. If the bearing temperature rises to between 120° and 180° C. above ambient, there will almost always be a complete bearing failure. Similar dramatic rises in temperature, which are well in excess of temperature spikes encountered during ordinary operation, can be found in truck axle bearings, factory machine bearings, motors, and other devices which are about to fail. If the problem which is inducing failure is addressed before failure occurs, a total breakdown can often be avoided. Unfortunately, the problem is seldom recognized before failure occurs because a temperature increase is not often visually apparent.

Signaling devices which provide a visual indication of temperature increases in bearings have previously been proposed. For example, U.S. Pat. Nos. 3,339,518 and 4,501,006 disclose indicators for detecting overheated bearings in vehicles such as railroad cars. Both of these devices include rigid tubular metal elements which are filled with a signal substance and closed with a plug. As the temperature inside the rigid container increases, its internal pressure correspondingly rises. When the differential pressure across the plug reaches a preselected value, it forces the plug out of the container to allow release of the signal substance into the environment. The signal substance, which is usually a colored dye, can be visually detected and remedial mechanical repairs made before ultimate failure occurs. Although such prior art signaling devices provide advance warning of mechanical failure, their operation depends on establishment of a differential pressure across the plug. This is a problem because the differential pressure can be affected by changing altitude of the railroad car. Another drawback of these devices is that they are rigid and cannot conform to the surface contours of a variety of objects having different shapes.

U.S. Pat. Nos. 3,569,695; 3,877,411; and 4,459,046 all show temperature signaling devices which incorporate an indicator wafer that changes color when its surrounding temperature exceeds a safe level. Although these devices are not affected by changing altitude, they still suffer from the problem of being flat and rigid. They are therefore useful primarily on flat surfaces and cannot be flexed to conform to the shape of a nonplanar substrate.

U.S. Pat. No. 2,694,997 discloses a bearing failure indicator which includes a colored wafer that melts upon reaching a certain temperature. U.S. Pat. No. 4,265,117 shows a thermocouple which is attached to a flexible, disc-like metal plate which has sufficient flexibility to conform to the general shape of a surface.

It is an object of this invention to provide a temperature signal indicator which can easily be adapted for use with a variety of objects having different shapes.

It is yet another object of the invention to provide such an indicator that can conform to the shape of a nonplanar surface of an object.

Yet another object of the invention is to provide an indicator which is not affected by changing altitude.

SUMMARY OF THE INVENTION

The foregoing objects are achieved by a temperature sensor having a flexible container body which holds a signal substance. An opening in the container is plugged with a material which melts at a preselected temperature and allows release of a signal substance from the container. The flexible container is capable of conforming to the shape of a nonplanar surface by deforming to match the outline of the substrate on which it is mounted. The internal pressure of the container changes when it is deformed, but this pressure change does not affect the plug because the plug responds only to a change in temperature and not changes in differential pressure across the plug.

In preferred embodiments, the container is an elongated tube which is mounted on a rectangular flexible base which carries magnets for attaching the base to the surface of the object being monitored. The signal substance within the container can be brightly colored, odoriferous, or foam upon exposure to the atmosphere.

The foregoing and other objects, features, and advantages of the invention will become more apparent from the following detailed description of several preferred embodiments which proceeds with reference to the accompanying drawings.

DETAILED DESCRIPTION OF THE PREFERRED EMBODIMENT

Figure 1:
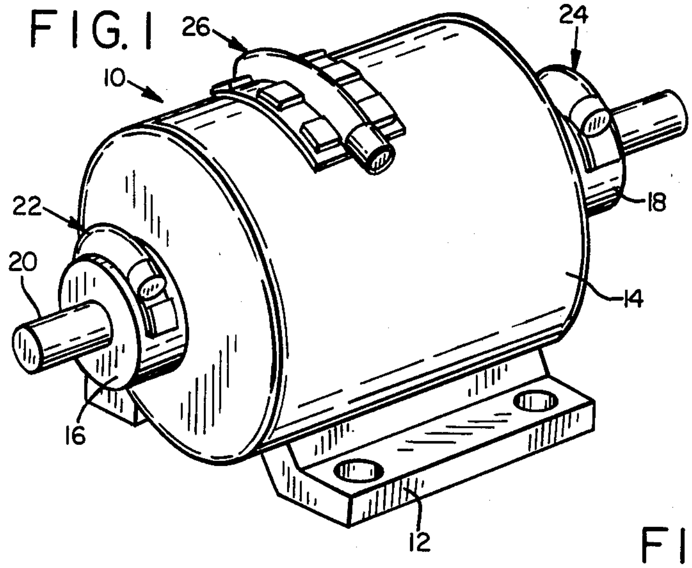
FIG. 1 is a perspective view of a motor with two different embodiments of the temperature sensors of the present invention mounted on its bearings and housing.

A motor 10 in FIG. 1 includes a base 12, cylindrical metal motor housing 14, and metal bearing housings 16, 18 through which shaft 20 is journaled. A pair of identical temperature sensors 22, 24 are mounted respectively on bearing housings 16, 18. Temperature sensor 26 is another embodiment of the invention which is mounted on the arcuate wall of cylindrical motor housing 14.

Figure 2:
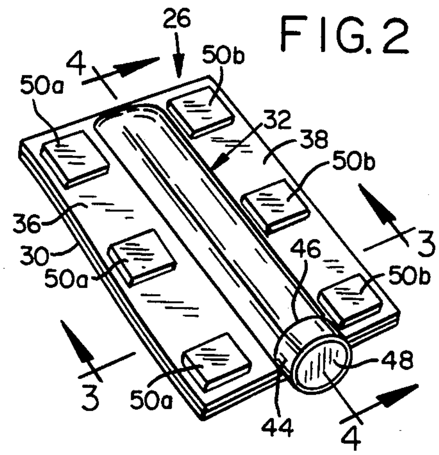
FIG. 2 is an enlarged perspective view of one embodiment of the temperature indicators shown in FIG. 1.
Figure 3:
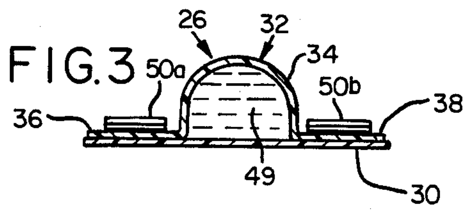
FIG. 3 is a cross-sectional view taken along section lines 3—3 in FIG. 2.
Figure 4:
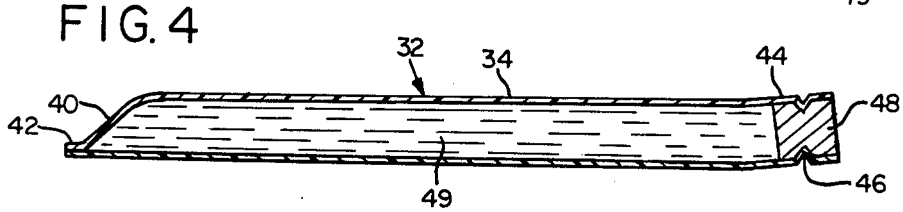
FIG. 4 is a cross-sectional view taken along section lines 4—4 in FIG. 2.

The structural detail of temperature sensor 26 is shown in FIGS. 2–4. It includes a rectangular, flexible base 30 which is made of a thin sheet of rubber, plastic, or similar material that is capable of flexing to conform generally to the shape of a curved surface, such as the arcuate wall of motor housing 14. The material of which base 30 is made must also be thermally conductive.

A flexible container tube 32, which is made of rubber, deformable plastic, or a similar flexible material, is attached to a top surface of base 30. As shown in FIG. 3, the tube includes an elongated raised ridge 34 which extends longitudinally along base 30, and a pair of integral rectangular flaps 36, 38 which extend outwardly along tube 32 and transversely across base 30. The flaps 36, 38, which are about as wide as ridge 34, are secured to base 30 by a liquid impermeable adhesive, heat sealing or other means which forms a liquid tight seal between the flaps and base. The rear of tube 34 slopes downwardly at 40 and is similarly sealed at 42 to form a fluid tight junction. As seen in FIG. 3, tube 32 is thicker than base 30 because the heat exchanging ability of tube 32 is not as important as the thermal conductivity of base 30. It is, in fact, preferable that tube 32 be somewhat insulative to prevent thermal loss from tube 32 to the environment.

The front end of tube 32 is open and is connected along a fluid tight seal to a rigid sleeve 44 which has an annular, V-shaped indentation 46 therearound that extends into sleeve 44. A plug 48 with a preselected, known melting point fills sleeve 44 and is snugly retained therewithin by indentation 46, which also makes a fluid tight seal between the plug and sleeve 44. The plug 48 is held securely enough within sleeve 44 that it is not displaced by changing pressure within tube 32.

Tube 32 is filled with a signal fluid 49. In the disclosed embodiment, fluid 49 is a suitable liquid which has been dyed red. The fluid could also be an odoriferous substance or a material which foams when it is released from the container. It is also possible to use a fluid which can give off a cloud of smoke or vapor and be detected by remote sensors which sound an alarm to indicate imminent mechanical failure of the monitored component.

Three square magnets **50*a* are secured, for example by glue, to the upper face of flap 36, and three similar magnets 50*b* are secured to the upper face of flap 38. Magnets 50*a* are equally spaced along the length of flap 36, while magnets 50*b* are equally spaced along the length of flap 38. Magnets 50*a*, 50*b* are chosen that generate a sufficient magnetic field through flaps 36, 38 and base 30 to securely attach sensor 26 to a metallic object, such as housing 14 of motor 10**.

Figure 5:
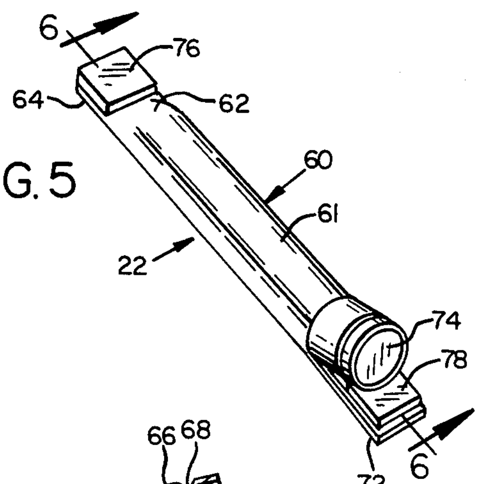
FIG. 5 is an enlarged perspective view of another embodiment of the temperature indicators shown in FIG. 1.

FIG. 5 shows the smaller sensor 22 after its removal from bearing housing 16. Sensor 22 includes a flexible tube 60 having a raised ridge 61 with a sloped rear 62 that forms a square rear flap 64 which is about the same width as ridge 61. The front of tube 60 is attached along a fluid tight seal to a rigid sleeve 66 which projects upwardly from base 70 at about a 30° angle and has an annular V-shaped indentation 68 therearound which extends into sleeve 66. The bottom of tube 60 is formed by a thin flexible base 70 which is thinner than the remainder of tube 60 to enhance its thermal conductivity. Base 70 is adhesively secured in the back to the rear flap 64 to form a fluid tight junction and extends forwardly beyond sleeve 66 as a front flap 72. The longitudinal edges of base 70 between flaps 64, 72 are sealed to tube 60 and do not form side flaps as in the embodiment of FIGS. 2-4. A plug 74 is retained within sleeve 66 and is made of a material which melts at a preselected temperature which is above the normal operating temperature of the object being monitored. A rear magnet 76 is adhesively secured to an upper face of rear flap 64, while a front magnet 78 is adhesively secured to front flap 72. Tube 60 contains a signal fluid 80, similar to fluid 49, which flows out of the tube when plug 74 melts to signal imminent mechanical failure of the part being monitored by sensor 22.

Figure 6:
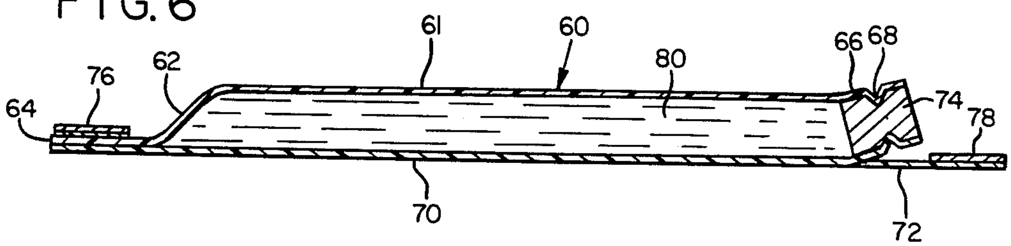
FIG. 6 is a cross-sectional view taken along section lines 6—6 in FIG. 5.
Figure 7:
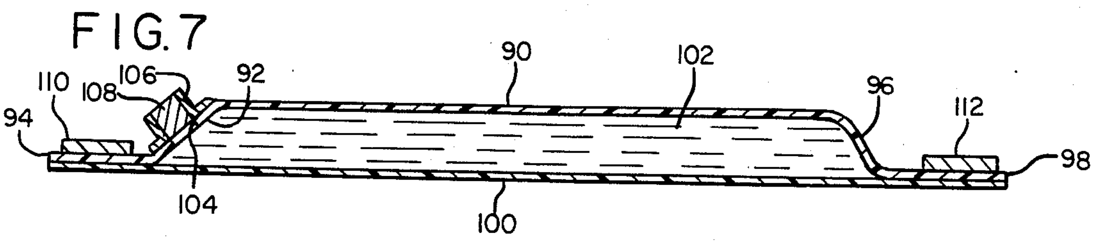
FIG. 7 is a cross-sectional view of yet another embodiment of the invention.

Yet another embodiment of the invention is shown in FIG. 7. This embodiment is similar to FIG. 6 and includes a tube 90 having a sloping rear wall 92 with a rear extension flap 94 and a sloping front wall 96 with a front extension flap 98. The flaps 94, 96 are sealed to a thin, thermally conductive flexible base 100, as are the longitudinal edges of tube 90, and the tube is filled with an indicator fluid 102. An orifice 104 is provided through sloping rear wall 92 and is surrounded by a reinforcement sleeve 106 which contains a plug 108 that melts at a preselected temperature. A magnet 110 is adhesively secured to rear flap 94, and a similar magnet 112 is adhesively secured to front flap 98.

The operation of all three embodiments is similar and will be illustrated with reference to temperature sensor 26 which is shown in FIGS. 1-4. The bottom face of flexible base 30 of sensor 26 is placed in contact with the surface being monitored, in this instance the arcuate wall of housing 14. The base 30, flaps 36, 38, and tube 32 all bend in an arc to conform to the arcuate surface of the housing wall, and magnets **50*a*, 50*b* hold sensor 26 in heat exchanging contact with the housing. Heat from housing 14 is easily transmitted through the thin flexible base 30 to indicator fluid 49 within tube 32. As the temperature of housing 14 rises, the temperature of fluid 49 correspondingly increases. When the temperature of fluid 49 reaches the melting point of plug 48, the plug melts and releases fluid 49 from tube 32. The appearance of the colored dye, odoriferous substance, foam, or smoke immediately alerts an observer that motor 10** is approaching a failure condition, and remedial or preventive action can then be taken.

Sensors 22, 24 operate in a similar manner. They are more suited for placement on narrow structures such as bearing housings 16, 18 because of their narrow width.

The plugs of the present invention can be made of any material having a known melting point. It is preferable that the melting point range of the material be quite narrow to permit release of the fluid at a well defined temperature. The plug could, for example, be made of carnauba wax which has a melting point of 84°-86° C.

Operating temperatures of most mechanical devices vary during use. The melting point of the plug should preferably be higher than any temperature spikes which occur during normal operation. If normal operating temperature spikes of a device are unknown, the temperature of the device can be monitored and graphed before the melting point of the plug is selected. When a mechanical device is about to fail, the temperature graph of the device begins to exceed dramatically the normal operating variations. This dramatic variation in temperature usually makes it possible to select a material for the plug which will have a melting point significantly higher than any normal operating temperature, yet will be low enough to warn of imminent failure in time to make repairs before failure occurs.

The present invention can also be used with a variety of mechanical devices having varying shapes. The flexibility of the sensor allows it to be bent to conform to irregular, nonplanar surfaces which are arcuate, angled, or ridged. The sensor can therefore be attached to bearing housings, motor housings, truck axles, engines, and many other objects having a variety of shapes. Flexing the sensor to conform substantially to the shape of the object (even if portions of the sensor base are not in contact with the object) enhances heat exchange. Such flexing does vary the internal pressure of the sensor tube, but this does not affect operation of the sensor because the plug is sensitive only to changes in temperature and not pressure.

Having illustrated and described the principles of the invention in preferred embodiments, it should be apparent to those skilled in the art that the invention can be modified in arrangement and detail without departing from such principles.

I claim all modifications coming within the spirit and scope of the following claims.

1. A temperature sensor for indicating a temperature condition of an object, comprising:

a flexible container means for holding a signal substance, the container means having a thermally conductive flexible base for contacting a surface of the object to transmit heat from the object to the signal substance; and plug means in communication with the signal substance for melting at a preselected temperature of the substance and releasing the signal substance from the container so as to indicate exposure to a preselected temperature condition of the object.

2. The temperature sensor of claim 1, wherein the container means is capable of conforming to the shape of a surface by deformation of the container and a change of internal pressure within the container.

3. The temperature sensor of claim 2 further including attachment means for securing the container to the object.

4. The temperature sensor of claim 2 further including a flexible base on which the container is mounted to the container for conforming to the shape of a surface.

5. The temperature sensor of claim 4 further including attachment means for securing the base to the object.

6. The temperature sensor of claim 1 wherein the signal substance is odoriferous.

7. The temperature sensor of claim 1 wherein the signal substance is colored.

8. The temperature sensor of claim 1 wherein the signal substance is a material which foams when it is released from the container.

9. A temperature sensor for indicating a temperature condition of an object, comprising:

a flexible elongated base capable of conforming to a surface of the object for contact therewith;

a flexible, elongated deformable tubular container mounted to the base and capable of conforming to the base by deforming and changing internal pressure within the container, the container having a closed end and an open end;

attachment means secured to said base for magnetically attaching the sensor to the object;

a signal substance within the container; and a plug in the open end of the container which seals the container and melts at a reselected temperature of the signal substance to release the signal substance from the container.

10. A method of detecting when a surface of an object reaches a predetermined temperature, the method comprising the steps of:

providing a flexible container having a base, the container holding a signal substance, wherein the container is capable of conforming to the shape of a surface by deformation of the container and a change of internal pressure within the container;

plugging the container with a plug at one end which melts to indicate a predetermined temperature; and attaching the base of the container in heat-transferring relationship to the object to be monitored.

11. The method of claim 10 wherein the object surface is curved, and the container is placed on the object by bending it to conform to the shape of the object's surface.

* * * * *